(12) United States Patent
Hamilton et al.

(10) Patent No.: US 8,806,114 B2
(45) Date of Patent: Aug. 12, 2014

(54) DYNAMIC STORAGE HIERARCHY MANAGEMENT

(71) Applicant: Microsoft Corporation, Redmond, WA (US)

(72) Inventors: James R. Hamilton, Bellevue, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/740,027

(22) Filed: Jan. 11, 2013

(65) Prior Publication Data
US 2013/0124811 A1    May 16, 2013

Related U.S. Application Data

(63) Continuation of application No. 11/954,145, filed on Dec. 11, 2007, now Pat. No. 8,375,190.

(51) Int. Cl.
*G06F 12/02* (2006.01)
*G06F 3/06* (2006.01)
*G06F 12/08* (2006.01)

(52) U.S. Cl.
CPC ............ *G06F 3/0685* (2013.01); *G06F 3/0649* (2013.01); *G06F 12/0866* (2013.01); *G06F 3/0605* (2013.01)
USPC .................... 711/103; 711/165; 711/E12.008; 711/E12.002

(58) Field of Classification Search
CPC ... G06F 3/0605; G06F 3/061; G06F 12/0866; G06F 3/0649; G06F 3/0685
USPC .......... 711/103, 105, 154, 156, 170, E12.001, 711/165, E12.008
See application file for complete search history.

(56) References Cited

U.S. PATENT DOCUMENTS

| 5,636,356 A | 6/1997 | Kakuta et al. |
| 5,860,083 A | 1/1999 | Sukegawa |

(Continued)

OTHER PUBLICATIONS

Gonsalves, "Seagate Combines Flash Memory", Hard Disk for Notebook Storage, Information Week, Oct. 8, 2007 retrieved on Oct. 25, 2007 from<<http://www.informationweek.com/news/showArticle.jhtml?articleID=202400049>>, 3 pages.

(Continued)

*Primary Examiner* — Pierre-Michel Bataille
(74) *Attorney, Agent, or Firm* — Dan Choi; Carole Boelitz; Micky Minhas

(57) ABSTRACT

A data block may be moved between a first medium and a second medium. The movement of the data block involves measuring the access characteristic of the data block as the data block is stored on the first medium. The performance characteristics of the first medium and the second medium are then determined, in which each performance characteristic has a static performance characteristic component and a dynamic performance characteristic component. Alternatively or concurrently, the static performance characteristic components of the first medium and the second medium may be compared, and the dynamic performance characteristic components of the first medium and the second medium are compared. Accordingly, the data block is moved from the first medium to the second medium when at least one of these comparisons indicate that the second medium is more suitable for storing the data block having the access characteristic than the first medium.

19 Claims, 13 Drawing Sheets

(56) References Cited

U.S. PATENT DOCUMENTS

| | | | |
|---|---|---|---|
| 6,000,006 | A | 12/1999 | Bruce et al. |
| 6,785,767 | B2 | 8/2004 | Coulson |
| 6,871,219 | B2 | 3/2005 | Noordergraaf et al. |
| 7,076,544 | B2 | 7/2006 | Katz et al. |
| 7,203,830 | B2 | 4/2007 | Fortin et al. |
| 7,260,634 | B2 | 8/2007 | Furukawa et al. |
| 7,484,074 | B2 | 1/2009 | Hepkin et al. |
| 7,774,550 | B2 | 8/2010 | Nomura et al. |
| 7,925,851 | B2 * | 4/2011 | Matsunami et al. ........... 711/162 |
| 8,307,163 | B2 * | 11/2012 | Chen et al. .................... 711/137 |
| 8,402,238 | B2 * | 3/2013 | Saito et al. .................... 711/162 |
| 2002/0083264 | A1 * | 6/2002 | Coulson ........................ 711/112 |
| 2006/0080501 | A1 | 4/2006 | Auerbach et al. |
| 2007/0067561 | A1 | 3/2007 | Kim |
| 2007/0168607 | A1 | 7/2007 | Takai et al. |
| 2007/0204102 | A1 | 8/2007 | Luby et al. |
| 2007/0226409 | A1 | 9/2007 | Sutardja et al. |
| 2008/0133830 | A1 | 6/2008 | Nitta et al. |
| 2008/0147968 | A1 * | 6/2008 | Lee et al. ....................... 711/103 |
| 2008/0235468 | A1 * | 9/2008 | Chen et al. .................... 711/154 |
| 2009/0150593 | A1 | 6/2009 | Hamilton et al. |
| 2009/0228669 | A1 * | 9/2009 | Slesarev et al. ............... 711/161 |

OTHER PUBLICATIONS

Graefe, "The five-minute rule twenty years later, and how flash memory changes the rules", Proceedings of the Third International Workshop on Data Management on New Hardware (DaMoN 2007), Jun. 2007, 9 pages.

Office Action for U.S. Appl. No. 11/954,145, mailed on Nov. 17, 2011, James R. Hamilton, "Dynamic Storage Hierarchy Management", 16 pgs.

Office action for U.S. Appl. No. 11/954,145, mailed on May 14, 2012, Hamilton et al, "Dynamic Storage Hierarchy Management", 15 pages.

Non-Final Office Action for U.S. Appl. No. 11/954,145, mailed on May 23, 2011, James R. Hamilton, "Dynamic Storage Hierarchy Management", 14 pages.

* cited by examiner

DYNAMIC STORAGE HIERARCHY MANAGEMENT

RELATED APPLICATIONS

This patent application is a continuation of and claims priority to U.S. Pat. No. 8,375,190, issued on Feb. 12, 2013, and entitled "Dynamic Storage Hierarchy Management," which is incorporated herein by reference.

TECHNICAL FIELD

The subject specification relates generally to information storage, and in particular to dynamic storage allocation.

BACKGROUND

Various forms of storage devices allow information to be held over relatively a long period without information degradation. A common storage medium is flash memory; specifically, flash memory is a non-volatile form of storage that retains information without drawing upon a constant source of power. This type of memory is often employed in a variety of consumer electronic devices such as memory cards, universal serial bus (USB), flash drives, personal data assistants (PDAs), digital audio players, digital cameras, mobile phones, and so forth.

Another common type of non-volatile storage medium is a magnetic disk, which enables information to be recorded according to a magnetization pattern. Similar to other storage media, magnetic disks can be configured in a variety of manners (e.g., Magnetoresistive Random Access Memory) as well as employed in many different applications. This type of storage device is commonly used in connection with databases and analog recordings.

In addition to non-volatile media, volatile forms of storage exist that provide certain benefits that may also be accompanied by particular disadvantages. For example, retrieval times for volatile media are generally faster than that for non-volatile media, and many operations have increased uniformity due to well-established standards. However, a fundamental drawback of volatile storage is that information is stored as electric charge or current flow and is, thus, lost when constant power is not available. A number of solutions have been suggested to mitigate this difficulty such as attaching an alternative power source, yet such solutions necessarily add to production and/or maintenance costs.

In classic operation, information is stored in one medium and portions of this information are not commonly transferred to another medium. Hence, conventional storage schema are generally subject to both advantages and disadvantages associated with a single, underlying storage medium type.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The subject matter disclosed and claimed herein, in one aspect thereof, comprises an architecture that can improve memory storage allocation. For example, different memory device types can possess different performance characteristics. In particular, flash memory can have a relatively fast response time and can withstand harsh operation conditions, such as a relatively high number of input/output (I/O) operations per second. In contrast, a hard disk has a relatively slow response time and is sensitive to harsh operation conditions; yet, a hard disk is often less expensive than flash memory in terms of cost per bit stored.

In classic operation, information is stored in one medium and portions of the information are not commonly transferred to another medium. In contrast, the claimed subject matter can provide optimization for storage that leverages relative advantages associated with memory types, while also compensating for associated disadvantages. For example, data can be monitored or analyzed to determine relevant data attributes, such as the number of references to the data per time (e.g., reference rate). Based upon the data attributes, a comparison can be made of storage characteristics (e.g., relative cost, storage capacity, latency, cache parameters, etc.) for available storage media to identify a storage medium that more optimally matches the data attributes. Accordingly, respective data can be matched with a storage medium that facilitates improved operation of a system with respect to a variety of metrics (e.g., cost, performance, reliability, integrity, volatility, priority . . . ).

In an aspect of the claimed subject matter, the architecture can operate upon a hierarchy of non-volatile memories (e.g., flash, fast hard disk drive, slow hard disk drive, magnetic tape, etc.), in a manner that differs from split disk configurations where 100% of the information is stored on disk with cache storage above. As opposed to a hybrid disk, the disclosed architecture can allow for storing N pages over M devices, where N and M are integers, and where the M devices have different characteristics and the N pages are stored commonly once; thus, different devices can be used.

Current market trends focus on improving memory characteristics such that a construct (e.g., application) can have increased performance upon a single memory type. As such, it is counter-intuitive to place information from a single construct upon multiple memory types. However, there are unexpected results of the claimed subject matter. For example, a cost-effective system that allows an application to operate at an unexpected efficiency level while placed on multiple memory mediums. Accordingly, the claimed subject matter teaches against conventional wisdom and current market trends.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
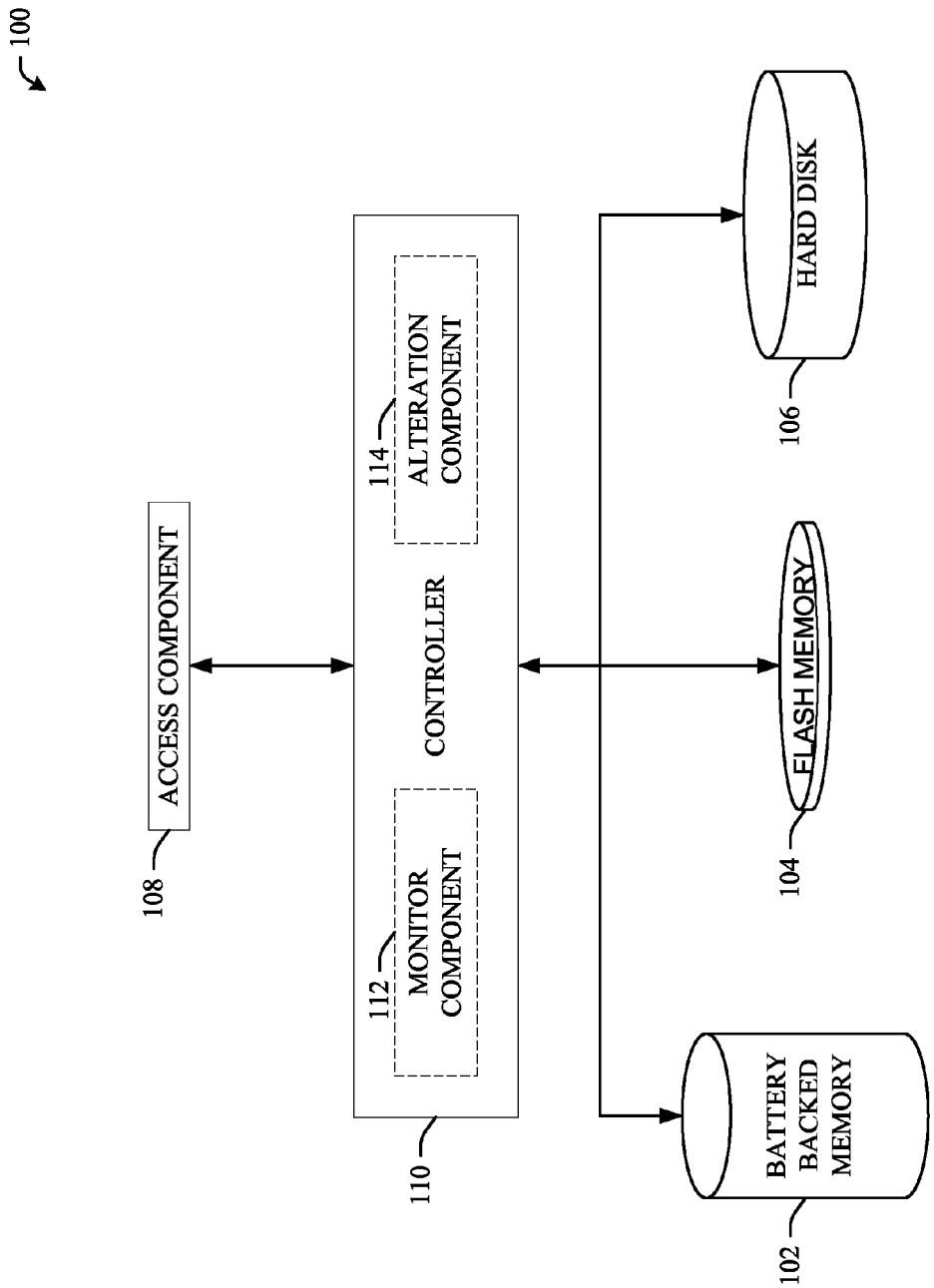
FIG. 1 illustrates a representative storage allocation system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components. As used in this application, the term "I/O density" means average I/Os per time over storage space (e.g., number of I/O requests per second per gigabyte).

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

For purposes of simplicity of explanation, methodologies that can be implemented in accordance with the disclosed subject matter are shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks need be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Aspects of the subject innovation can be practiced in a number of different embodiments. Generally, aspects are applicable to a device that manages information in blocks. For instance, information can be dynamically placed in different locations to assist in management of a database. However, the innovation can be applied outside of a database application, such as through storage of information in a personal electronic device (e.g., digital television storage devices).

With reference now to the drawings, FIG. 1 discloses example system 100 that can facilitate dynamic memory allocation or storage. In a system (e.g., system 100) with multiple types of memory, memory can be dynamically allocated as a function of demand, preference, or utilization of respective applications in order to optimize overall system performance. Economic factors can also be taken into account when determining memory storage allocation.

For example, applications (or portions thereof) that run at a relatively high I/O density generally perform well on a high performance storage media such as flash memory, which is typically able to withstand data-intensive operations, such as those producing high I/O rates (e.g., high number of accesses). However, flash memory can be more expensive than a low performance memory. Conversely, applications that run at a relatively low I/O density can gain appropriate functionality though operation on low performance memory, such as hard disks. For instance, hard disks can be cheaper to obtain, but at the cost of throughput (e.g., a limited I/O density can be supported at one time and thus operations can take longer to complete.) Thus, the claimed subject matter can dynamically store blocks of data on either high performance memory or low performance memory, depending on the usage of the data. In particular, frequently accessed information can be dynamically stored to high performance memory, while other information can be stored to other low performance.

Because high performance memory can be more expensive, the use of flash memory, for example, can be limited to storing information for which performance benefits equal or exceed marginal costs. Remaining memory portions can be comprised of cheaper and lower performance memory. Over an operational session of a run time system, distribution of information placed into different tiers can change, leading to reallocation (e.g., information that is being accessed less frequently changes from high performance memory to lower performance memory.) In addition, it can be appreciated that, for systems where multiple memory tiers are available, there can be a performance cost associated with the disclosed analysis, yet this performance cost can be mitigated in whole, or in part. For example, instead of performing an initial performance assessment, an exemplary software system can dynamically reallocate data blocks based on learned characteristics of memory tiers. Additionally or alternatively, memory devices can report a pre-populated performance profile, compiled in accordance with well-established schema and obtained through well-defined protocols. These and other features are described in more detail infra.

In accordance therewith, system 100 illustrates three different memory types: high performance memory (e.g., battery backed memory 102), middle performance memory (e.g., flash memory 104), and low performance memory (e.g., hard disk 106); characterized either collectively or individually as storage device(s). While only three specific memory devices are depicted, it is to be appreciated that the claimed subject matter can be practiced with substantially any suitable storage device. In addition, classification of memory performance can be relative to performance of contemporary memory units. For instance, while in system 100, flash memory 104 is illustrated as middle performance storage, in a system where flash memory, hard disk, and magnetic tape are utilized, flash memory might be alternatively classified as a high performance memory.

System 100 can also include access component 108 that can reference various sets of data saved in storage devices. As data is accessed, reference rates will typically increase and a storage location holding a set of data can become inadequate, e.g., data is accessed more frequently than a storage medium can withstand without degradation. In order to mitigate this degradation or to otherwise increase system performance or cost-effectiveness, the data can be dynamically moved to different storage devices based on, e.g., a measure of data reference rates. One example reference rate can be I/O reference rates, such as page reference rates.

Additionally, system 100 can include controller 110 that can be operatively and/or communicatively coupled to the storage devices in order to, e.g., monitor the devices. Information describing each individual storage device (e.g., storage device 102-106) can be commonly composed on two components: a static component (e.g., a device profile, prepared by a manufacturer) and a dynamic component (e.g., as observed by the host system during operation). Based on information collected with respect to operation or performance of the storage devices, a variety of actions can take place that can improve system performance, which is further detailed infra.

Controller 110 can include or be operatively coupled to monitor component 112 that can perform various observations that relate to storage devices of system 100. For example, when a set of data is accessed, monitor component 112 can make a record of the access. Appreciably, storage devices can have pre-determined life spans; for instance, a flash memory block can have about one million programming cycles before an expected failure occurs. Accordingly, monitor component 112 can count number of programming cycles to determine memory blocks that are near a pre-determined fault threshold. These blocks can be flagged and avoided in connection with storage of data that is frequently accessed over units with lower experienced cycles.

Alteration component 114 can also be included in (or operatively coupled to) controller 110 and can transfer data based on observations of monitor component 112. Often, reference rates will constantly change or evolve over time for data in system 100 due, e.g., to references made by applications that can change for a variety of reasons such as updating software, a change in business practice or policy and so on. As these rates change, alteration component 114 can rotate data to a storage device that has more appropriate characteristics in response to the change in reference rate. Thus, information storage locations can be changed dynamically based on real-time access patterns.

In accordance with an aspect, page tracking can be employed to bridge applications between two or more storage devices such as flash memory 104 and hard disk 106. One objective can be to create an effective price model for a memory device (e.g., a device employing both flash memory and hard disk memory). One manner of tracking can be accomplished by determining a number of I/O transactions for a page per second. If a page is considered active (e.g., the page possesses a relatively large number of I/O transactions per second), the page can be transferred to a faster memory device, such as flash memory 104. However, a marginally active or inactive page (e.g., the page receives a relatively small number of I/O transactions per second) can be stored to slower memory, such as hard disk 106 or to a memory with lower performance characteristics. Placement in different media can occur automatically; for example, artificial intelligence or machine learning techniques can be utilized to control or facilitate such automated placement. It should be appreciated that, in the course of operation there can be separation of page placement mechanisms from components responsible for placement policy, which can, inter alia, allow such mechanisms to be pluggable.

In one aspect, system 100 can employ a standard benchmark to determine memory placement. For example, an application can compare performance results against a benchmark index to determine where the application should store data. Additionally or alternatively, data placement can be based on storage size—a system can be configured to hold application information on, say, hard disk 106 as data is stored on a device. Yet, once hard disk 106 begins to be populated, application information can be saved to flash memory 104 based on the information's reference rate (e.g., page reference rate).

Figure 2:
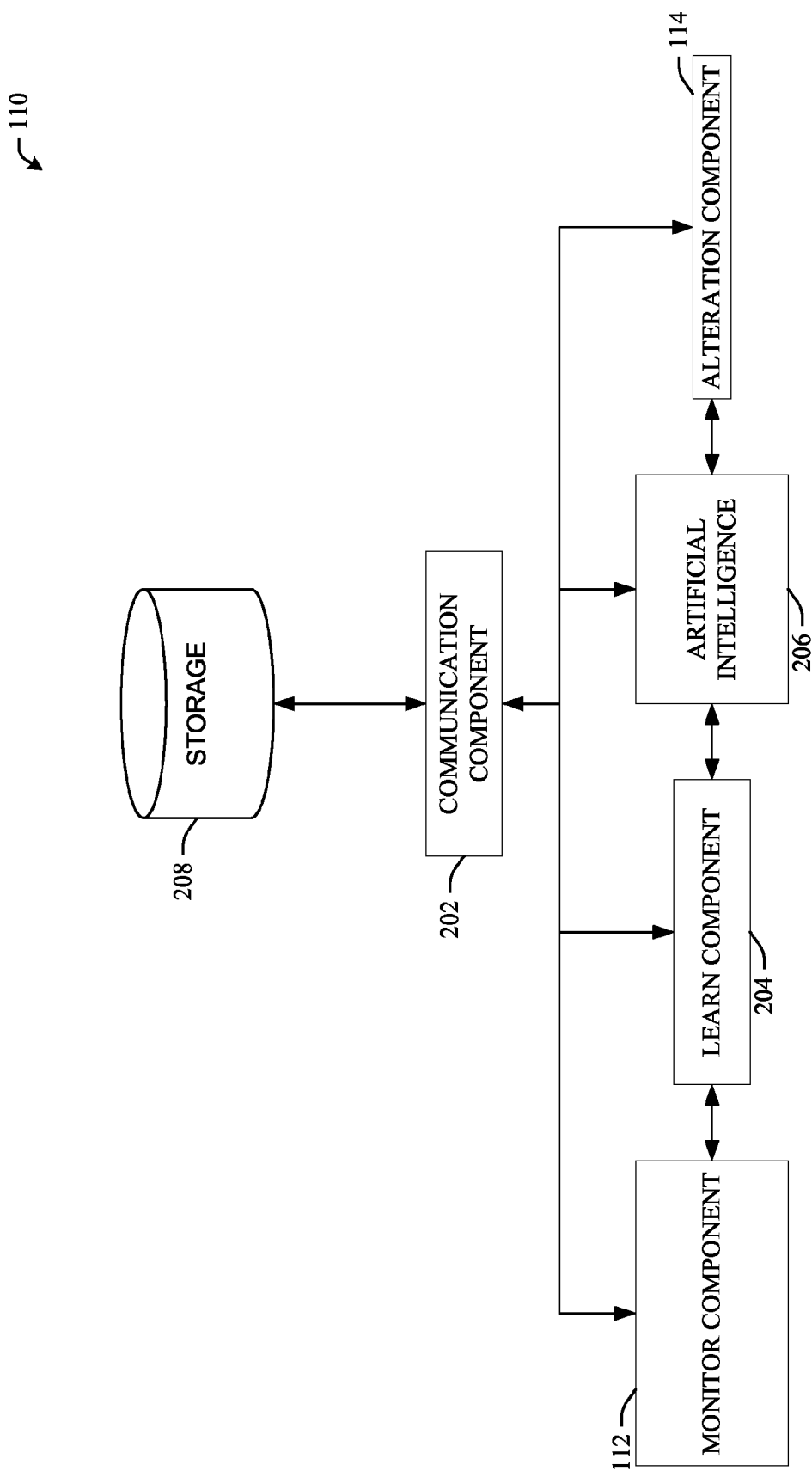
FIG. 2 illustrates a representative controller in accordance with an aspect of the subject specification.

FIG. 2 discloses an example configuration of controller 110 (e.g., a storage management system) in accordance with an aspect of the appended claims. Monitor component 112 can scrutinize various operations of storage units (e.g., storage 208) to determine functionality. For example, monitor component 112 can acquire information concerning storage characteristics, in particular reference rates that relate to data recorded on storage 208. Such can be accomplished by way of communication component 202 that can function according to a number of different embodiments and, hence, transactions with storage devices can take place in a wireless manner, a hard wire configuration, different implementations for various storage devices, etc.

Learn component 204 can make resolutions that concern storage of information. Thus, when a particular application runs on controller 110, it is generally the case that certain information is commonly accessed, while other information is only rarely accessed. In accordance therewith, learn component 204 can modify operation of various components (e.g., artificial intelligence (AI) component 206) to comply with learned data. In an illustrative case, when an e-mail application is launched, contact list data might have an increased number of references. Hence, learn component 204 can instruct artificial intelligence component 206 to prepare for a relatively large number of moves since it is predicted that contact list data will have high or increasing reference rates. Such feature can increase efficiency given some actions can take place prior to observation by the monitor component 112 and a preemptive response can mitigate decreased efficiency. Monitor component 112 can use a static profile (e.g., created at manufacture) or a dynamic profile (e.g., created through observation of storage devices) to determine where data blocks should be located.

Artificial intelligence (AI) component 206 can make at least one inference or at least one determination in relation to memory allocation. AI component 206 can function as a processor for controller 110, and various scenarios can occur that are processed by AI component 206. For example, AI component 206 can determine or infer that a reference rate for a particular data segment exceeds a particular threshold. An inference can be provided suggesting that the data segment should, therefore, be moved to a more appropriate storage location. Accordingly, a message can be sent to alteration component 114 indicating where the data segment should be located (e.g., a move from flash memory to hard disk or vice versa).

AI component 206 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, AI component 206 can also include methods for capture of logical relationships such as theorem provers or more heuristic rule-based expert systems. Artificial intelligence component 206 can be represented as an externally pluggable component, in some cases designed by a disparate (third) party.

Storage 208 can be utilized by various components of controller 110. Typically, storage 208 is internal to controller 110 and can hold information relevant to operation of controller 110 (or components thereof). For instance, storage 208 can include an index that is referenced by AI component 206. In determining whether a memory portion is insufficient to complete operations efficiently (e.g., more transactions associated with information in a storage medium are requested than can be processed in an adequate amount of time), AI component 206 can compare access rates against an index in storage 208. Based potentially on a result of this comparison, a determination and/or inference can be provided.

By way of illustration, a portion of saved data included in storage medium 208 can be experiencing 100 accesses per second, which is greater than that of recommendation profiles stored in the index. Thus, measured accesses are greater than a static profile recommendation of, say, 50 accesses per second or a dynamic profile recommendation of, for example, 60 accesses per second. AI component 206 can make a determination that the saved information should be dynamically moved to a new location that is better suited to handle 100 accesses per second.

Alteration component 114 can follow instructions issued by AI component 206 relating to dynamically recording data in various storage media. Alteration component 114 can utilize communication component 202 to carry out operations concerning information movement. For instance, alteration component 114 can receive an instruction that a piece of data has experienced a decreased reference rate and should be transferred to a more suitable storage device. Alteration component 114 can obtain the data from a first storage medium (e.g., flash memory), temporarily holds the data in storage 208, and subsequently or simultaneously store the data in a second storage medium (e.g., hard disk.)

Figure 3:
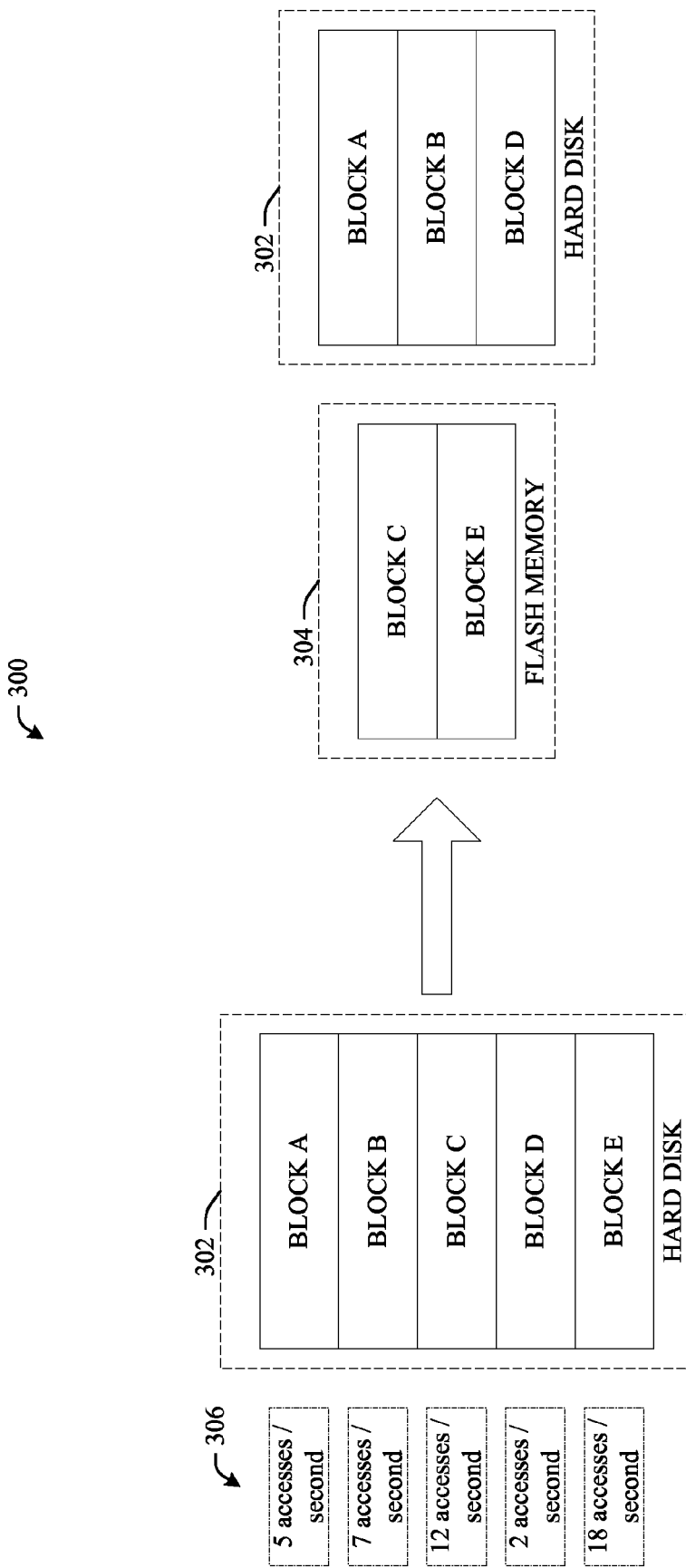
FIG. 3 illustrates a representative storage distribution arrangement in accordance with an aspect of the subject specification.

FIG. 3 discloses example memory allocation 300 that utilizes hard disk 302 and flash memory 304. Initially, five blocks (e.g., pages) of information can be saved to hard disk 302. As various operations are performed, information blocks can have associated reference rates (e.g., I/O reference rates, page reference rates, etc.). Memory allocation 300 shows reference rates 306 associated with the various blocks (e.g., to the left of a block is corresponding reference rate 306.)

Monitor component 112 of FIG. 1 can make an observation of the reference rates 306 that relates to different blocks in hard disk 302. A determination can be made by artificial intelligence component 206 of FIG. 2 indicating that reference rates that are above a set threshold (e.g., above about 10 accesses per second) should be transferred to flash memory 304 due to the higher number of accesses (e.g., Block C and Block E.) Alteration component 114 of FIG. 1 can transfer those blocks with reference rates 306 above the threshold to flash memory 304. While hard disk 304 and flash memory 302 are expressly illustrated, it is to be appreciated that other memory type can be utilized in memory allocation 300 without departing from the spirit or scope of the claimed subject matter.

Figure 4:
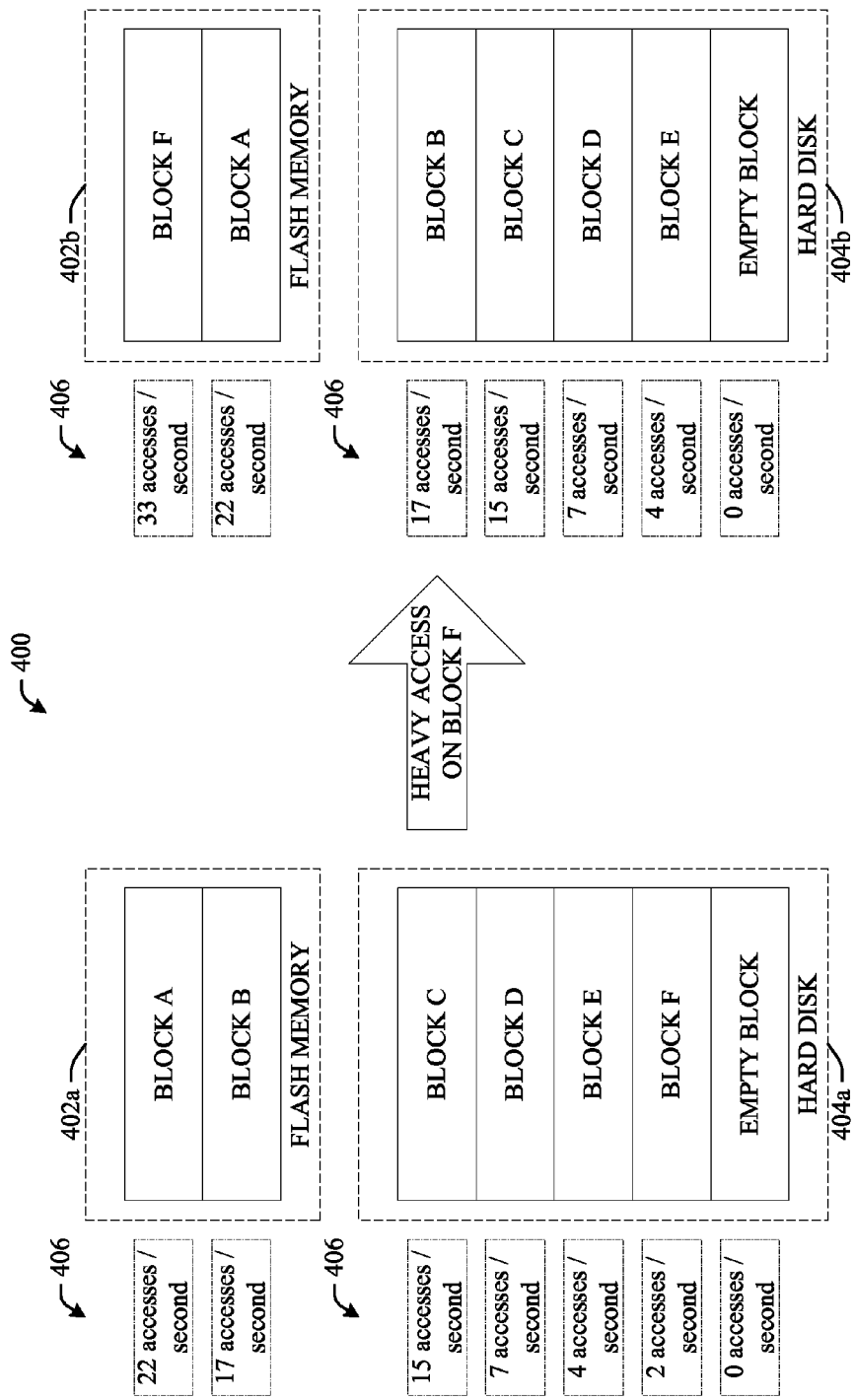
FIG. 4 illustrates a representative data placement scheme in accordance with an aspect of the subject specification.

Turning now to FIG. 4, example memory block implementation 400 is depicted that can be managed by controller 100 of FIG. 1. In general, memory storage can be configured to allow blocks of information with a relatively high reference rate to be stored in high performance memory, such as flash memory 402. In implementation 400, information blocks with the two highest reference rates in comparison to other information blocks are placed in flash memory 402, while remaining information is stored in hard disk 404. Initially, Block A and Block B are stored in flash memory 402 (e.g., a first state of flash memory 402a) while remaining blocks (e.g., Blocks C through F) are stored to hard disk 404 (e.g., a first state of hard disk 404a); however, subsequent placement illustrated by 402b and 404b can be determined by corresponding reference rates 406.

Access component 108 of FIG. 1 can place a relatively large number of references upon Block F such that Block F is measured to jump from 2 accesses per second to 33 accesses per second, and now has the highest reference rate 406 of stored information. This can be detected by monitor component 112 of FIG. 1 and an instruction can be instantiated to rearrange placement of the Blocks. Accordingly, Block F can be transferred to flash memory 402 (e.g., flash memory in a second state 402b), while Block B moves to hard disk 404 (e.g., hard disk in a second state 404b.)

Portions or pieces of information can also be arranged within an individual storage medium according to reference rates 406 of corresponding Blocks. For instance, portions of storage devices can have different attributes (e.g., different times for which programming cycles have occurred on a portion.) Information can be set to increase and/or optimize efficiency by placing information that has a history of moving a relatively large amount in portions that have a low history of programming cycles. As shown, information can be held in a set order while located in storage (e.g., information blocks with high reference rates are located near logical tops of storage devices.)

Figure 5:
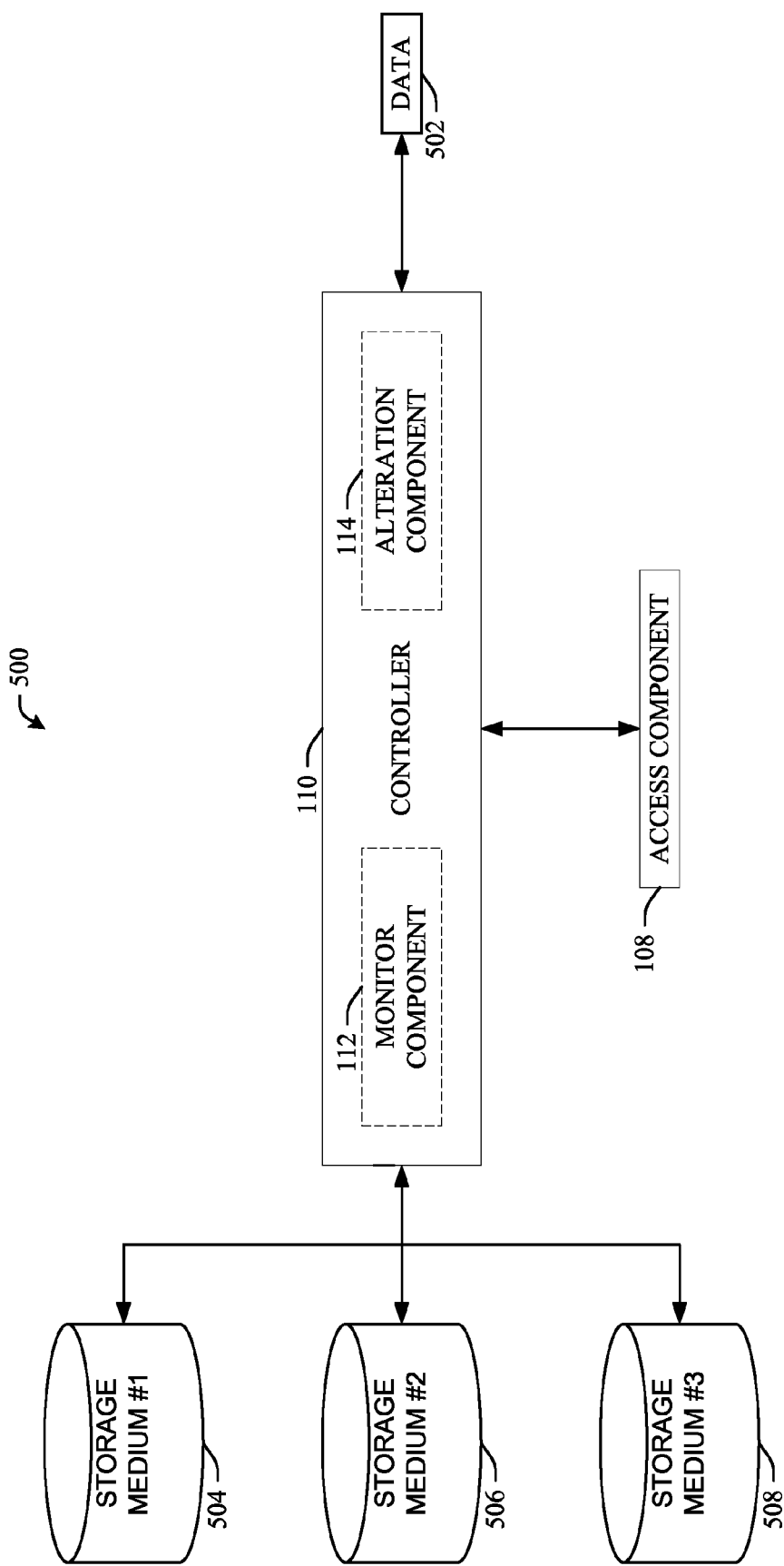
FIG. 5 illustrates a representative storage placement system in accordance with an aspect of the subject specification.

Referring to FIG. 5, example system 500 that can allocate or update data storage across multiple storage media is provided. System 500 can include data 502 that can be received by controller 110 for storing to storage media 504-508. Data 502 can originate from any number of different sources. For example, data 502 can be downloaded, received from a computer, an application, or another storage medium and so on. Monitor component 112 can observe the relevant access attributes of data 502, and AI component 206 of FIG. 2 can analyze data 502 and determine an appropriate initial storage location. Alteration component 114 can input data in an appropriate storage medium based on a determination of alteration component 114 (e.g., storage medium #1 504, storage medium #2 506, or storage medium #3 508).

Over time, access component 108 can refer to data 502 stored in various storage mediums; thus, data 502 can be associated with characteristics of a reference rate. Depending on these characteristics, data 502 can be moved to different storage locations dynamically with properties that match data characteristics. For instance, a high performance memory that can withstand a relatively large number of references can receive information that has a history of being accessed frequently.

In accordance therewith, a vast amount of metadata can be acquired concerning data storage. Since controller 110 can perform initial allocation and re-allocation, a richer context can be provided that relates to data usage, reaction, or history. Controller 110 can have re-setting capabilities such that reference rates used in determining a destination for data 502 can be for a set period. For instance, artificial intelligence component 206 of FIG. 2 can view reference rates over the previous hour, previous minute, etc. Therefore, out-of date information is not taken into account and the system 500 can utilize a more efficient model. In addition, AI component 206 can determine recurring usages patterns in order to allocate to one storage medium during, say, weekends or from 4:00 pm to 8 pm but to another storage medium at other times.

Figure 6:
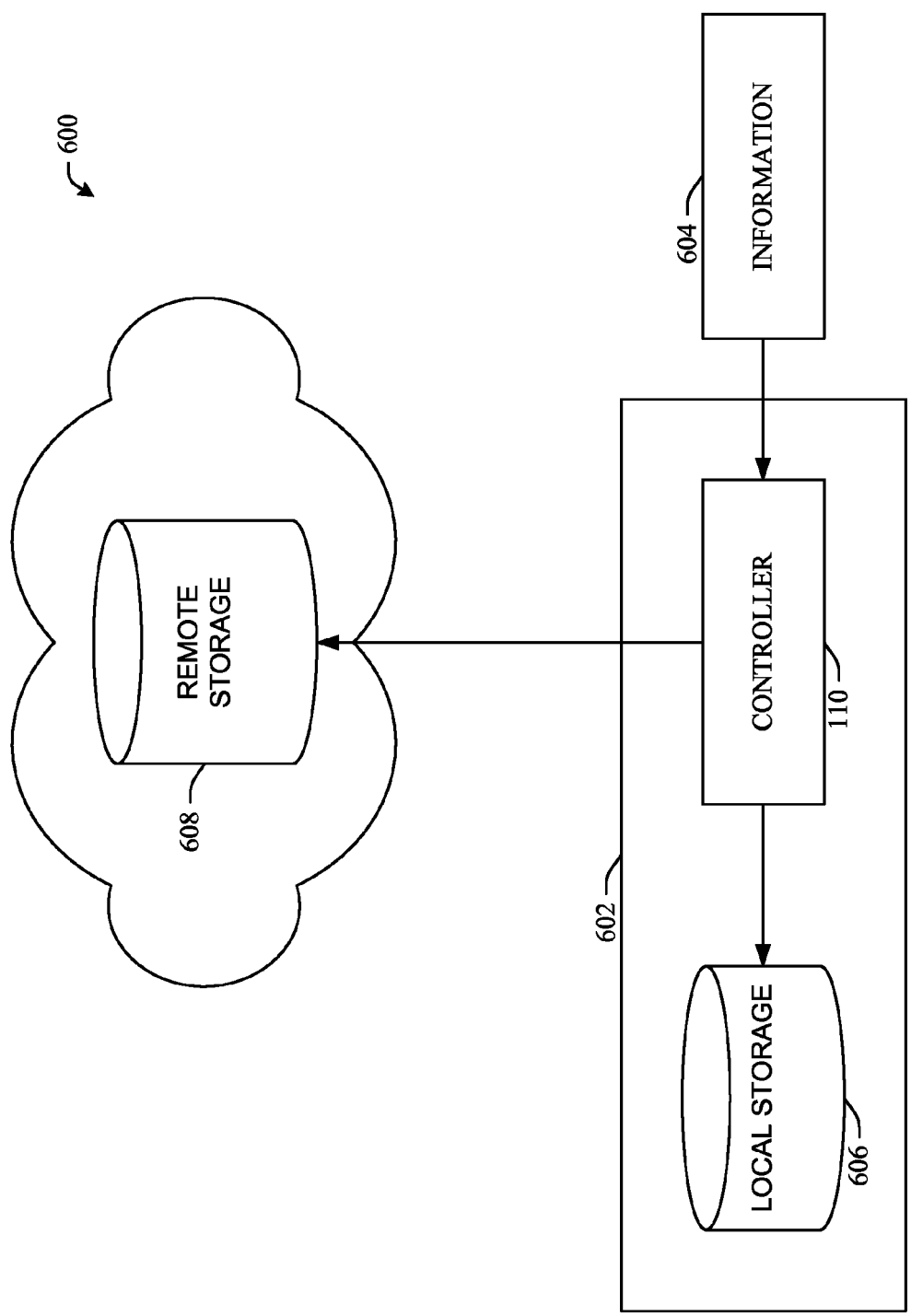
FIG. 6 illustrates a representative allocation system that places information between local storage and remote storage in accordance with an aspect of the subject specification.

FIG. 6 discloses example system 600 for allocation of information across remote storage media (e.g., storage media at different physical locations communicating through a peer-to-peer configuration, communication as host to computer, etc.). System 600 can include electronic device 602 that can allow a user to perform various operations, such as creating and editing digital records. While performing operations, various amounts of information can be used at different rates. For instance, electronic device 602 can be a cellular telephone that enables a user to make telephone calls as well as to send text messages. However, in consider the case in which a user of the cellular telephone rarely uses text message capabilities, but actively engages in telephone calls.

Information 604 can enter electronic device 602 according to a number of different paths. For example, electronic device 602 can download information 604, information 604 can be received as an attachment, etc. Upon receipt, information 604 can be initially processed and allocated to a storage location. In the illustrative instance, if information 604 relates to a call, then information 604 can be recorded in local storage 606 automatically due to frequent utilization of telephone calling features; otherwise, information 604 can be saved in remote storage 608.

As electronic device 602 operates, certain portions of information 604 will generally become more important than other portions (e.g., information relating to cellular telephones becomes accessed more frequently). In response, controller 110 can allocate memory storage based on how frequently information 604 (or portions thereof) is used (e.g., re-allocate if information is initially stored when it enters the electronic device 602). As indicated, there are two storage devices: local storage 606 and remote storage 608. Information that is determined or inferred to be more important can be saved to local storage 606, which can improve system 600 performance since commonly used information is physically closer, more integrated with the electronic device 602, more accessible, more reliable, and so forth. Accordingly, it should be readily appreciated that while remote storage 608 can exist, all or portions of information 604 need not be delivered to remote storage 608. It should also be appreciated that, according to one aspect, local storage 606 is generally a high performance storage medium (e.g., flash memory) while remote storage 608 is typically a lower performance storage medium (e.g., hard disk). It should also be underscored that system 600 can be configured to utilize multiple local storage devices and/or multiple remote storage devices.

As characteristics of system 600 evolve, information 604 can be re-allocated to different memory locations. For example, if the user of the previous example ceases or decreases utilization of electronic device 602 as a telephone and begins using text message capabilities extensively, controller 110 can move information between remote storage 608 and local storage 606.

Figure 7:
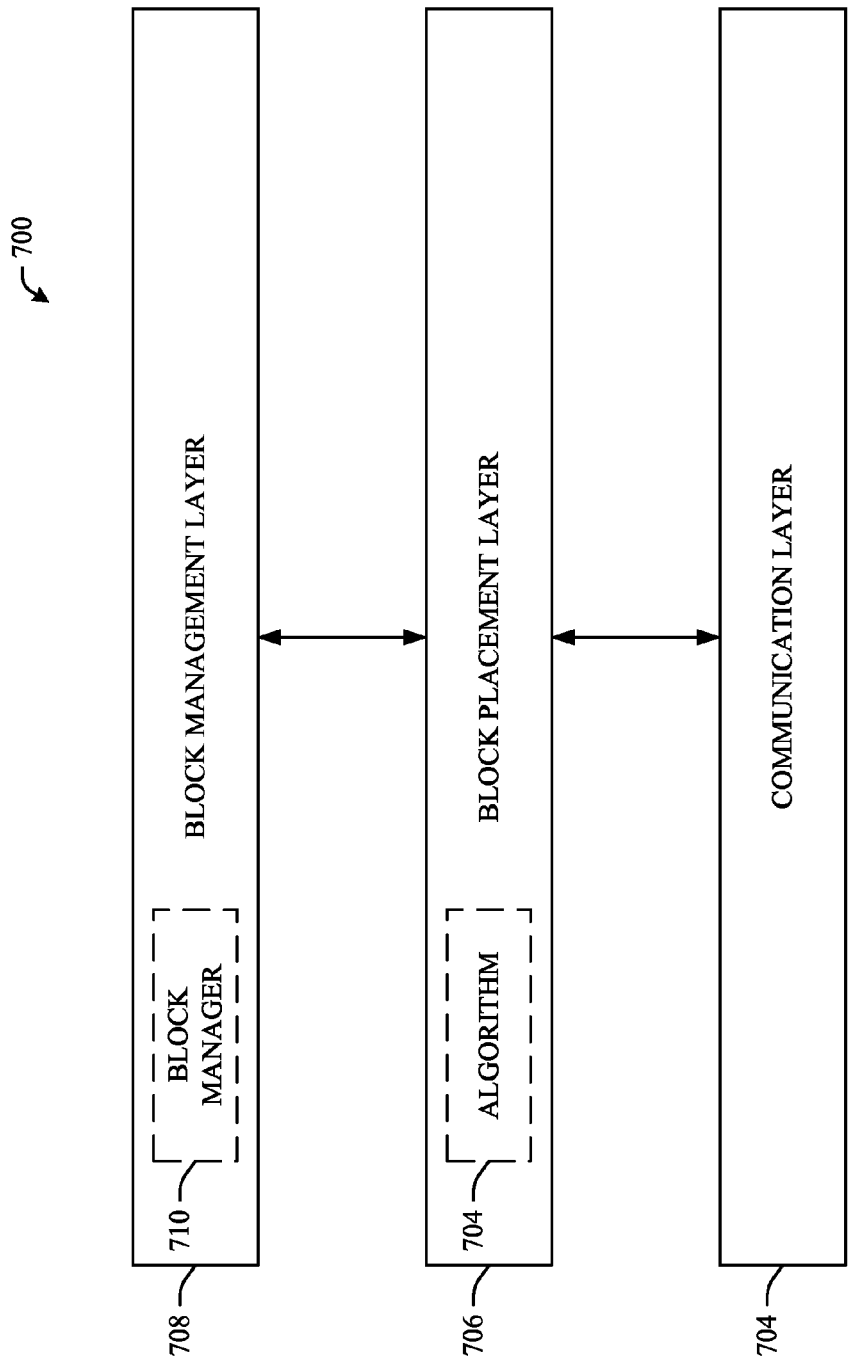
FIG. 7 illustrates a representative report mechanism of performance characteristics in accordance with an aspect of the subject specification.

FIG. 7 discloses example system 700 that can report performance characteristics relating to data recordation. Thus, while capabilities often focus on the host, it is to be appreciated system 700 can be implemented by a device. It is to be further appreciated that system 700 can apply to a host unit (e.g., a unit with remote storage 608 of FIG. 6) or a device unit (e.g., electronic device 602 of FIG. 6). Communication layer 702 can provide for interaction between the host unit and the device unit (e.g., by way of wireless communication). When the device initializes, communication layer 702 of the host can engage the device and a request can be made to the device for a table that includes device parameters. If the device includes the table, then such can be transmitted to the host through communication layer 702; if on the other hand the device does not include the table, then system 700 can generate an appropriate table through observation of the device. Information included in the table can be integrated to modify operation of at least one algorithm 704 of the system 700 (e.g., an algorithm used by the AI component 206 of FIG. 2).

Block placement layer 706 can determine where pieces of information are to be stored (e.g., dynamic placement of information blocks between at least two different storage devices). Commonly, such determinations are made with the aid of at least one algorithm 704. Algorithm 704 can match block usage patterns against a performance profile (e.g., a well-defined schema), and a performance profile comparison can be used in determining where information should be stored to maximize or optimize system performance.

Block management layer 708 can communicate with firmware of device layers through the performance profile to learn characteristic information concerning the firmware. Block management layer 708 can implement block manager 710 to perform adaptive measurement of the device (e.g., make observations that relate to operation of the device firmware in order to determine how to modify the algorithm 704). Features or actions of block management layer 708 can enable modification of this profile, which can, therefore, be dynamic.

Figure 8:
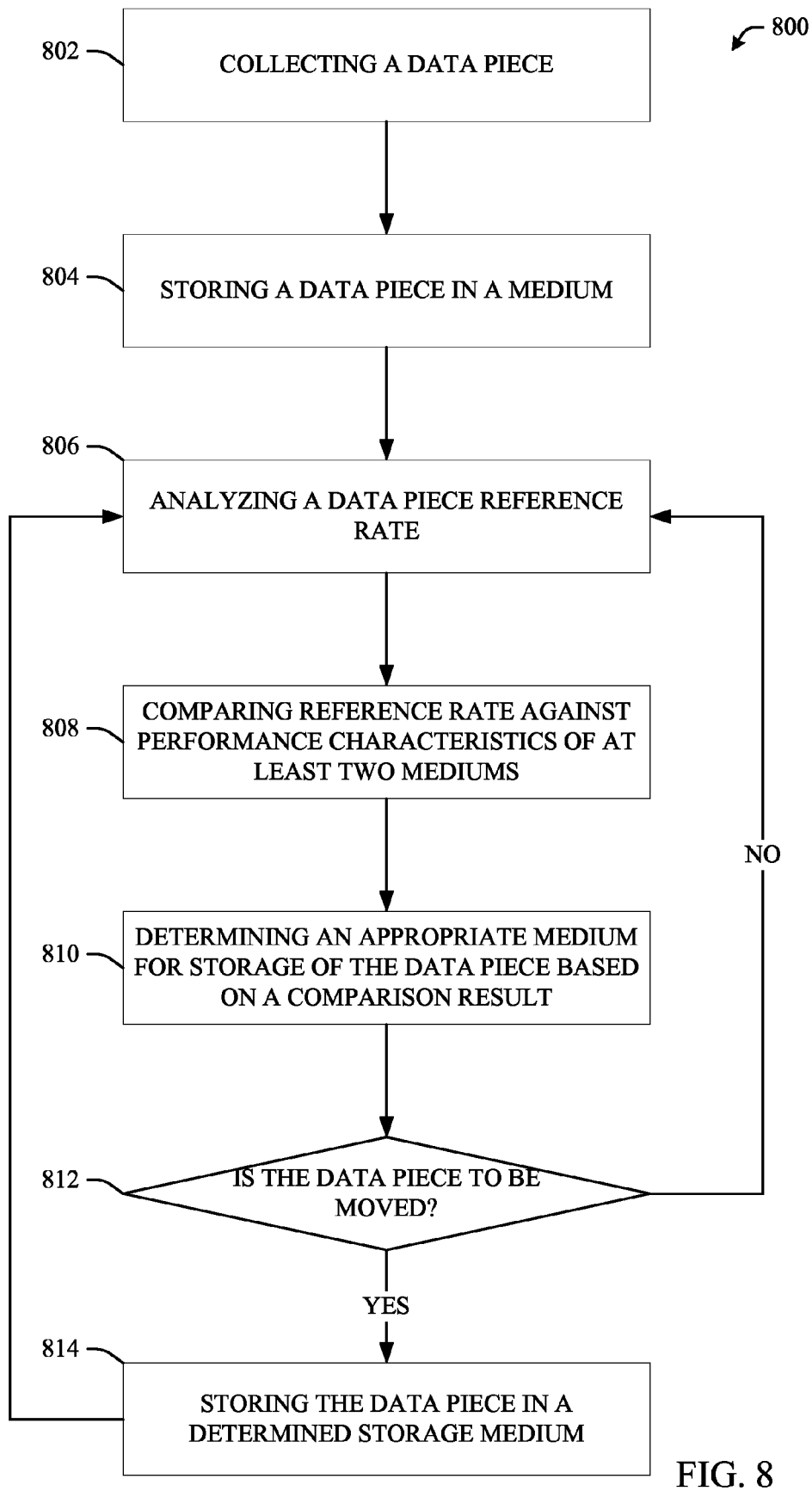
FIG. 8 illustrates a representative data allocation methodology in accordance with an aspect of the subject specification.

Turning now to FIG. 8, example methodology 800 for operating a controller, such as the controller 110 of FIG. 1 is illustrated. Methodology 800 can allow for various types of processing to occur with regard to information access or retrieval. The controller can be electronically coupled to at least two storage devices, where a first storage device has a first performance characteristic and a subsequent storage device has a subsequent performance characteristic. The first characteristic or the subsequent characteristic can be a summation of at least one static characteristic with at least one dynamic characteristic. For instance, factory cost per access is X while a determined cost per access is Y. First or subsequent characteristic summation can be X+Y, X*0.2+Y*0.8 (e.g., applying weighting factors), X*Y, X/Y, or substantially any suitable or appropriate measure.

At reference numeral 802, a piece of data can be collected. The piece of data commonly enters a controller operating the methodology 800 in a number of different manners. The data piece can be downloaded, received as a message or attachment, installed through an application, etc. Moreover, data collection can include inherent actions, such as sorting data to better understand the context or contents of what is collected, identifying a sender, performing security operations (e.g., virus checking), and so forth.

At reference numeral 804, the data piece can be stored in a medium. Generally, collected data can be retained in a designated or default storage medium. This can be a temporary storage location or a medium that is intended for relatively long-term storage (e.g., flash memory, hard disk, etc.) Storage in various media can take place according to different aspects of the claimed subject matter; in one example, information can be initially compressed and evaluated to estimate a medium that is originally appropriate (e.g., referring to FIG. 6 and associated description, if data relates to telephone functionality, then such data is initially stored in a high performance medium).

At reference numeral 806, a reference rate of the data piece can be analyzed by, e.g., examining block metadata. In an initial state, data typically has a reference rate of zero since no accesses have yet been performed and/or observed. Appreciably, analysis can be continuous and/or persistent; thus, when an access to the data piece occurs, a reference rate log can be updated accordingly. In addition to reference rate, other evaluations can be performed, such as determining a size of obtained data.

At reference numeral 808, the reference rate of the data piece can be compared against performance characteristics of at least two storage media. A common controller can include a table of performance characteristics of various storage media. For instance, flash memory can have characteristics of being high performance and expensive while hard disk is low performance and inexpensive. Reference rate information can thus be compared against performance characteristics found in the table.

At reference numeral 810, an appropriate medium for storage of the data piece can be determined based upon a comparison result. This result of the comparison can produce more than one adequate result. For instance, if data has an extremely high reference rate (e.g., about 100 accesses per second), then an appropriate medium is a device that can handle high reference rate (e.g., flash memory rated to handle about 120 accesses per second and battery backed memory rated to handle about 600 accesses per second). In the disclosed case, either flash memory or battery backed memory can be selected.

At reference numeral 812, a determination can be made as to whether a data piece should be moved, such as transferring the data piece between storage locations. For instance, information recognized as important can be placed in high performance storage initially. However, even if reference rates for the data piece are high, yet the information is already located in appropriate storage then there is no need to move information to improve performance.

At reference numeral 814, the data piece can be stored in a suitable storage medium. Determination of the suitable storage medium can occur, e.g., at act 812. For example, data with a low reference rate that is being stored in a high performance medium can be costly and inefficient. Information transfers from an initial storage medium to a more appropriate storage medium can remedy or mitigate these inefficiencies. Upon completing act 814, methodology 800 can return to act 806 to continue analysis and dynamic movement of information in storage.

Figure 9:
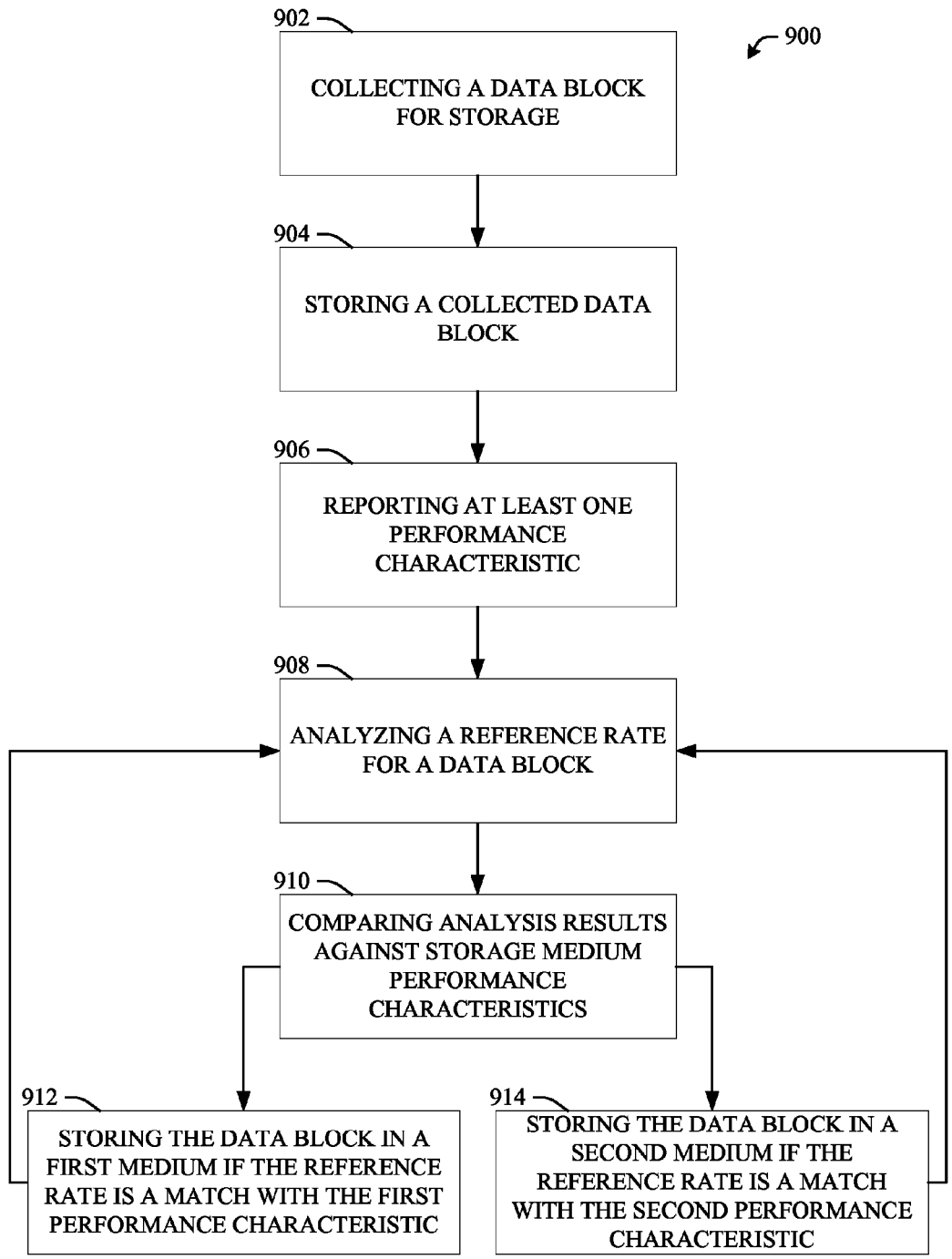
FIG. 9 illustrates a representative methodology of data storage transfer in accordance with an aspect of the subject specification.

FIG. 9 discloses example methodology 900 for storing information based on storage medium performance characteristics. It should be appreciated that aspects disclosed in other methodologies can be applied to the methodology 900. Generally, at reference numeral 902, a data block can be collected for storage. Collection of data can include downloading information from an auxiliary source, receiving a message with data, etc. It is further understood that act 902 can include wireless communication as well as a hard wire configuration. A subsequent action can take place in conjunction with collecting a data block, such as sending a confirmation message that data was received successfully.

At reference numeral 904, the data block collected at act 902 can be stored. In one aspect, an initial allocation of data can occur once data is successfully collected. Since received data does not typically have an access rate, initial allocation can be on a storage medium that has a low performance characteristic. However, such storage can be in a temporary location that allows data to be evaluated so a prediction can be made as to where data should be initially placed.

At reference numeral 906, at least one performance characteristic can be reported. For example, collecting a medium performance characteristic reported by a storage medium, such as a characteristic at manufacture time. As another example, the collected performance characteristic can be augmented with an observed measurement. Common storage devices include various performance characteristics that can have advantages and disadvantages in relation to storing a data block. Example performance characteristics can include but need not necessarily be limited to response time (e.g., amount of time to return a request), cache parameters (e.g., a temporary storage location that has a specific response time), latency (e.g., time between receiving an access request and executing the access request), at least one economic factor (e.g., cost.) Appreciably, an altered performance characteristic can be used by other acts described herein.

At reference numeral 908, a reference rate for a data block can be analyzed. For example, reference rate can be indicated by block metadata. At reference numeral 910, reference rate analysis determined at act 908 can be compared against storage medium performance characteristics collected at act 906. Depending on a result of the comparison, the data block can be stored appropriated. At reference numeral 912, the data block can be stored in a first medium if the reference rate is a match with a first performance characteristic. However, the comparison can also produce a result of storing a data block in a subsequent medium if the reference rate is a match with a subsequent performance characteristic as indicated at reference numeral 914.

Figure 10:
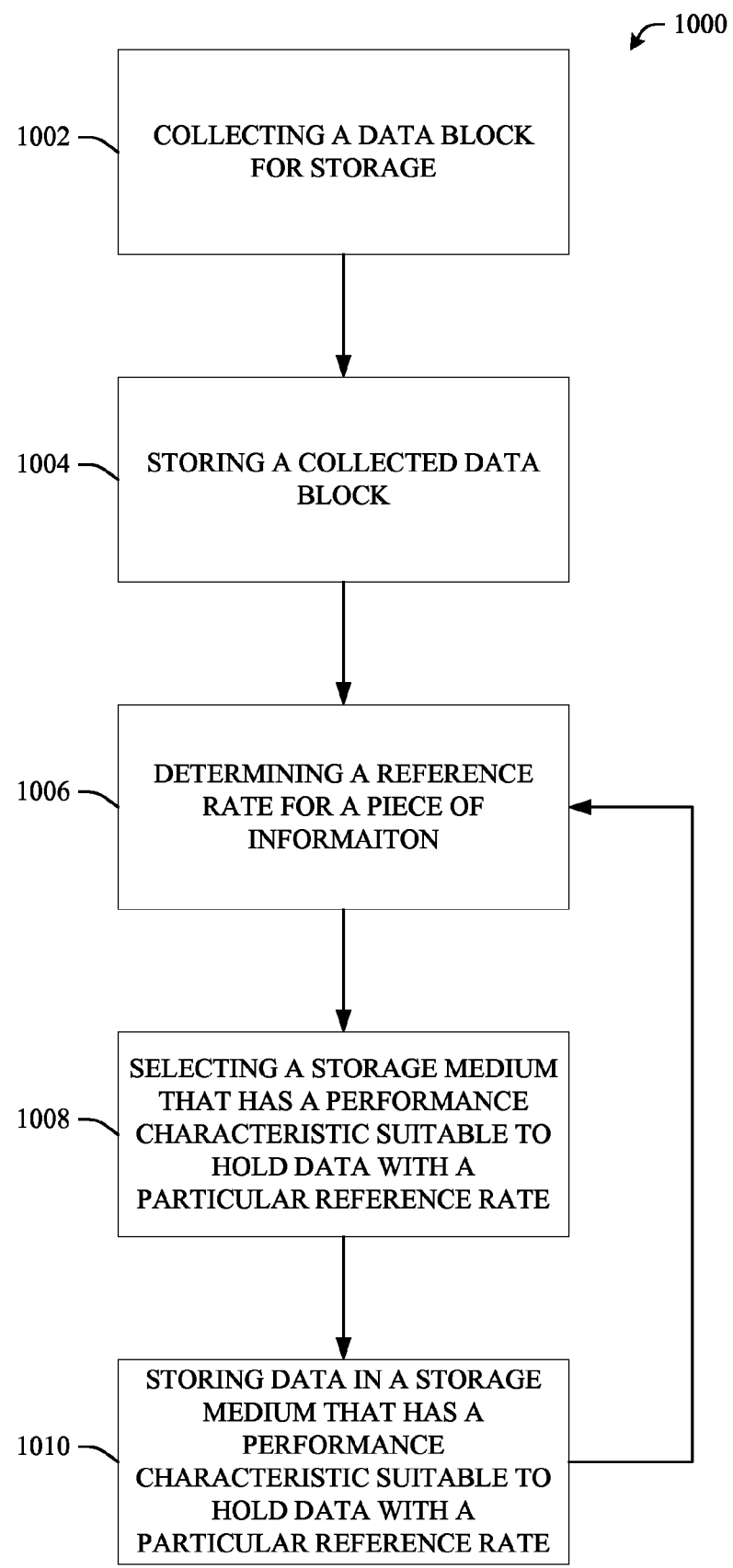
FIG. 10 illustrates a representative data storage methodology in accordance with an aspect of the subject specification.

FIG. 10 discloses example memory allocation methodology 1000 for placement of data in a suitable medium. Aspects disclosed in other methodologies can be applied to the methodology 1000. At reference numeral 1002, a data block can be collected for storage and collected data blocks can then be recorded through storing a collected data block as depicted at reference numeral 1004. In addition, at reference numeral 1006, a reference rate for a piece of information can be determined. At reference numeral 1008, storage medium that has a performance characteristic suitable to hold data with a particular reference rate can be selected. Moreover, at reference numeral 1010 data can be stored in the storage medium that has a performance characteristic suitable to hold data with a particular reference rate selected at act 1008.

Figure 11:
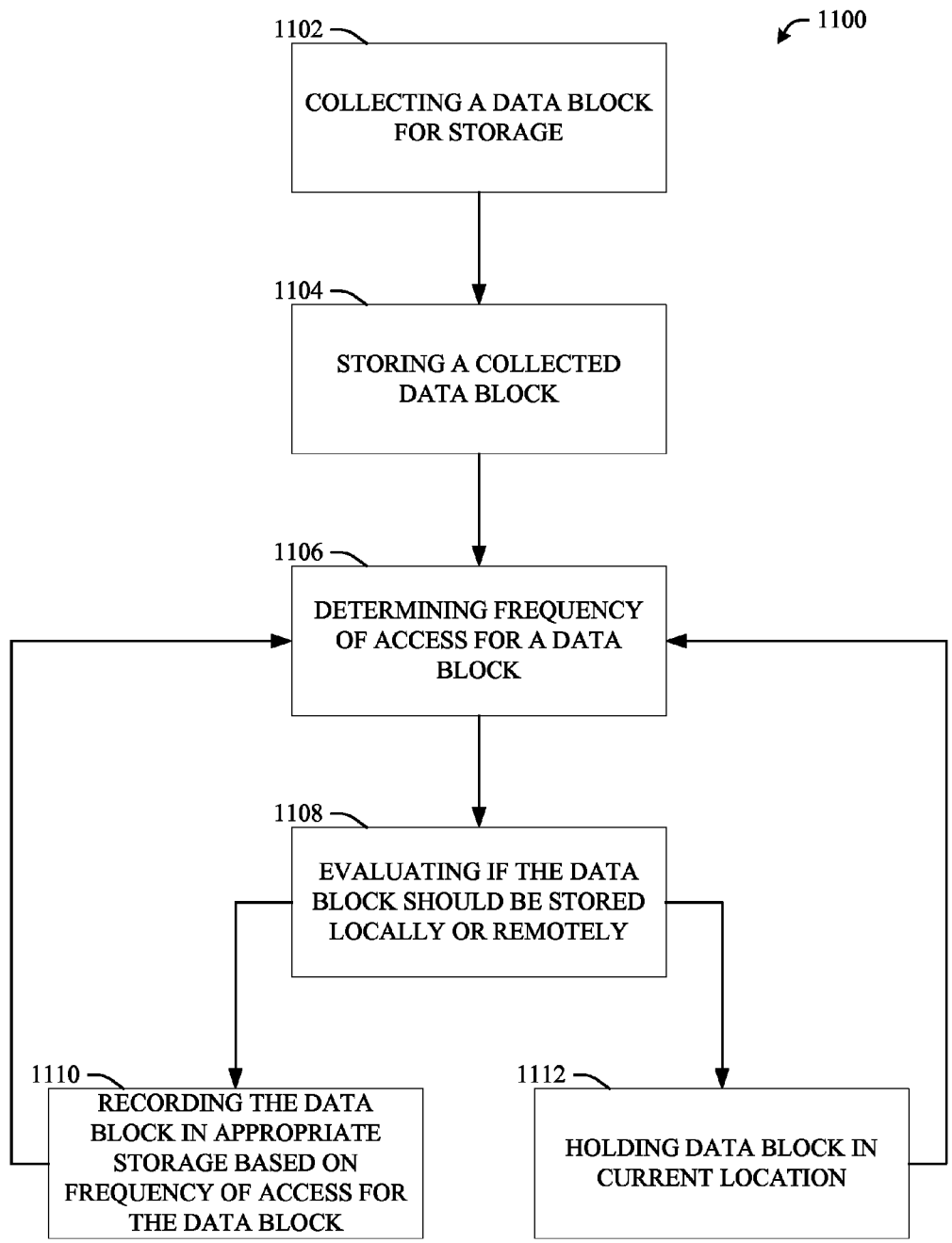
FIG. 11 illustrates a representative methodology for storing data between a remote storage location and a local storage location in accordance with an aspect of the subject specification.

With reference now to FIG. 11, example methodology 1100 for dynamically allocating memory between local storage and remote storage is depicted. At reference numeral 1102, a data block can be collected for storage. Collection of data can occurs in different manners; downloading information from an online source, installing an application, etc. are examples of collecting data that can be practiced. Moreover, it is to be appreciated that wireless communication as well as a hard wire configuration can be implemented when collecting data. Various other supplemental actions can take place, such as running a log of incoming data.

At reference numeral 1104, the collected data block can be stored to a storage medium. When data is first received by a system utilizing methodology 1100, there is commonly an initial storage of information. In one example, information can initially be stored locally; if after a pre-determined period of time information is not accessed a minimum amount of times, then information can be transferred to a remote location. However, using a different illustration, information can initially be stored at a remote location. If information is accessed a relatively large number of times, then such information can be dynamically moved to local storage.

At reference numeral 1106, frequency of access for a piece of information can be determined Different applications can place various amounts of draw on data. Thus, as information is accessed more and more frequently, changes can take place in a storage device to account for these changes efficiently. Therefore, understanding frequency of access can be a relevant factor in adequately placing information in different storage locations. Appreciably, determinations can be made by passive observation, performing estimation calculations, having access requests pass through a metadata gathering component, etc.

At reference numeral 1108, a suitable destination for the data can be evaluated. For example, the evaluation can relate to whether data should be stored locally or remotely. A result of the determination detailed at act 1106 can be a basis for selecting an appropriate storage location. According to one embodiment, how often information is accessed can be a primary criterion for determining a storage location. However, other contextual information can be taken into consideration, such as suitability of storage (e.g., even if data is accessed often, if information would cause damage to local storage, then it can be retained in remote storage.)

At reference numeral 1110, the piece of data can be recorded in appropriate storage based on frequency of access for the piece of data. For example, when information is to be moved from one storage location to another, then, in one instance, information stored in a local unit can be accessed rarely and be pushed to remote storage. It is to be appreciated that methodology 1100 can operate with multiple remote storage mediums and/or local storage mediums.

At reference numeral 1112, a determination that the data piece should remain in a current location can be made. For instance, it is possible that data has an access rate that matches that current storage location, therefore information does not need to move and/or transferring the data would not increase efficiency or market considerations. Since methodology 1100 can practice dynamic data allocation, it should be understood that acts 1110 and 1112 can return to determining frequency of access. As access rates change, data can be shifted between local and remote storage.

Figure 12:
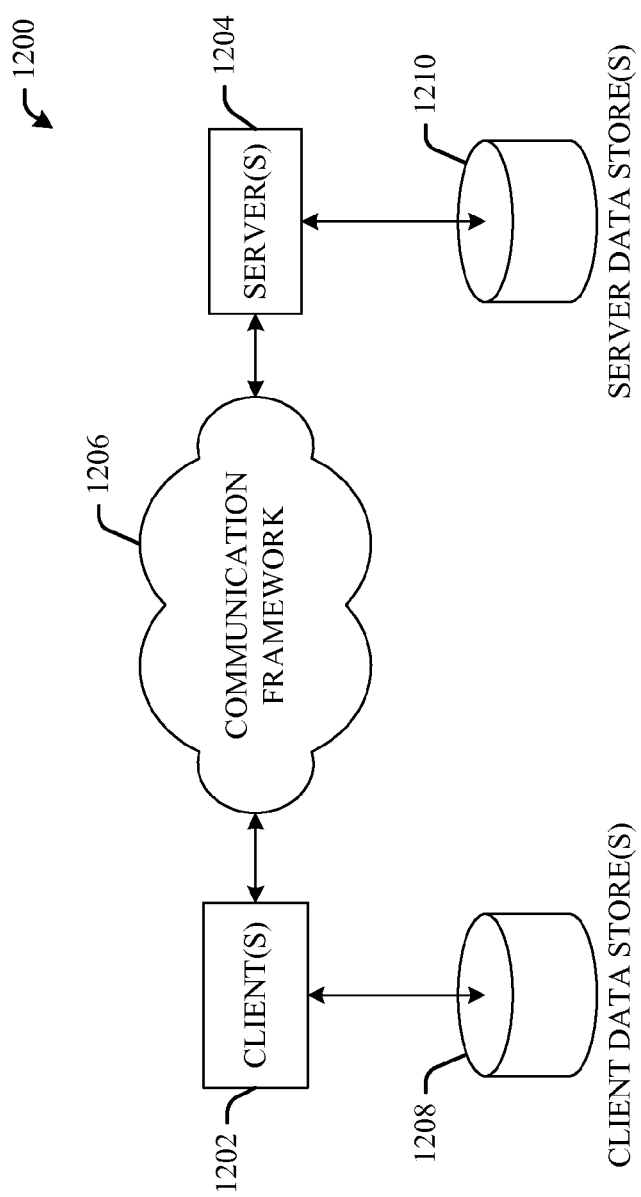
FIG. 12 illustrates an example of a schematic block diagram of a computing environment in accordance with the subject specification.
Figure 13:
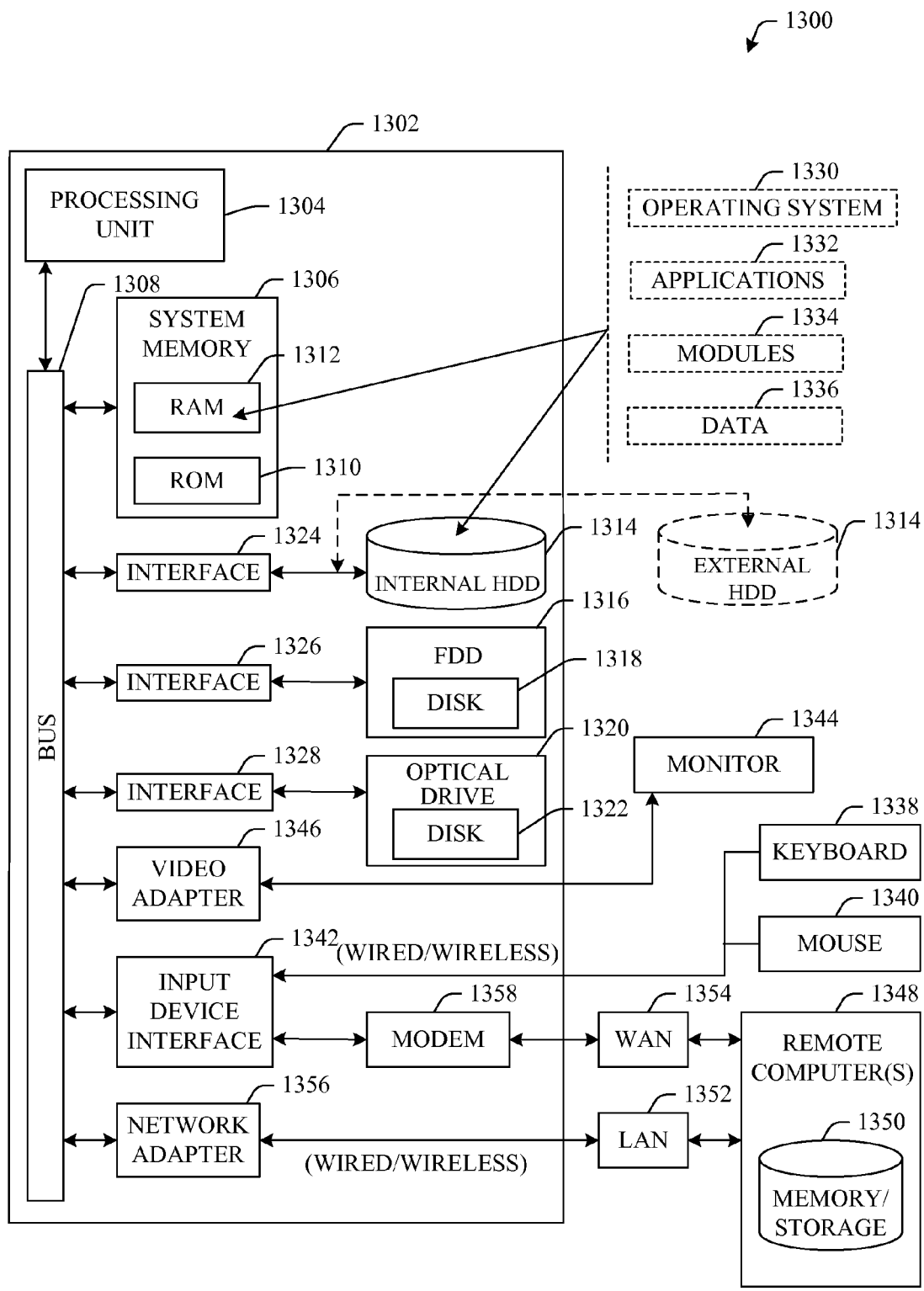
FIG. 13 illustrates an example of a block diagram of a computer operable to execute the disclosed architecture.

In order to provide a context for the various aspects of the disclosed subject matter, FIGS. 12 and 13 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 12, there is illustrated a schematic block diagram of a computing environment 1200 in accordance with the subject specification. The system 1200 includes one or more client(s) 1202. The client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

Referring now to FIG. 13, there is illustrated a block diagram of a computer operable to execute the disclosed architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.1a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A computer-implemented method, comprising:
   measuring an access characteristic for a data block that is stored in a first medium;
   determining a corresponding performance characteristic for each of the first medium and a second medium, each performance characteristic including a static performance characteristic component and a dynamic performance characteristic component; and
   moving the data block from the first medium to the second medium when at least one of a first comparison of the static performance characteristic components of the first medium and the second medium or a second comparison of the dynamic performance characteristic components of the first medium and the second medium indicates that the second medium is more suitable for storing the data block having the access characteristic than the first medium,
   the static performance characteristic component of the performance characteristic for the first medium or the second medium includes a static-access-per second recommendation and the dynamic performance characteristic component of the performance characteristic for the first medium or the second medium includes a dynamic access-per-second recommendation.

2. The computer-implemented method of claim 1, wherein the first medium or the second medium is one of a battery backed memory, flash memory, or a hard disk.

3. The computer-implemented method of claim 1, wherein the access characteristic of the data block includes a frequency of access for the data block.

4. The computer-implemented method of claim 3, further comprising moving an additional data block stored on the second medium and having an additional frequency of access that is less than the frequency of access of the data block to the first medium in exchange for moving the data block to the second medium.

5. The computer-implemented method of claim 1, wherein the static characteristic component of the performance characteristic for the first medium or the second medium further includes a factory cost per access and the dynamic characteristic component of the performance characteristic for the first medium or the second medium further includes a determined cost per access.

6. The computer-implemented method of claim 1, wherein the first medium is in local communication with a host and the second medium is in remote communication with the host.

7. A computing device, comprising:
one or more processors; and
a memory storing modules executable by the one or more processors, the modules perform acts comprising:
measuring an access characteristic for a data block that is stored in a first medium, the access characteristic of the data block includes a frequency of access for the data block;
determining a corresponding performance characteristic for each of the first medium and a second medium, each performance characteristic including a static performance characteristic component and a dynamic performance characteristic component; and
moving the data block from the first medium to the second medium when at least one of a first comparison of the static performance characteristic components of the first medium and the second medium or a second comparison of the dynamic performance characteristic components of the first medium and the second medium indicates that the second medium is more suitable for storing the data block having the access characteristic than the first medium,
moving an additional data block stored on the second medium and having an additional frequency of access that is less than the frequency of access of the data block to the first medium in exchange for moving the data block to the second medium.

8. The computing device of claim 7, wherein the first medium or the second medium is one of a battery backed memory, flash memory, or a hard disk.

9. The computing device of claim 7, wherein the modules further perform an act of storing the data block in the first medium.

10. The computing device of claim 7, wherein the static performance characteristic component of the performance characteristic for the first medium or the second medium includes a static access-per-second recommendation and the dynamic performance characteristic component of the performance characteristic for the first medium or the second medium includes a dynamic access-per-second recommendation.

11. The computing device of claim 7, wherein the static characteristic component of the performance characteristic for the first medium or the second medium includes a factory cost per access and the dynamic characteristic component of the performance characteristic for the first medium or the second medium includes a determined cost per access.

12. The computing device of claim 7, wherein the first medium is in local communication with a host and the second medium is in remote communication with the host.

13. A computer-readable memory storing computer-executable instructions that, when executed, cause one or more processors to perform acts comprising:
measuring an access characteristic for a data block that is stored in a first medium;
determining a corresponding performance characteristic for each of the first medium and a second medium, each performance characteristic including a static performance characteristic component and a dynamic performance characteristic component; and
moving the data block from the first medium to the second medium when at least one of a first comparison of the static performance characteristic components of the first medium and the second medium or a second comparison of the dynamic performance characteristic components of the first medium and the second medium indicates that the second medium is more suitable for storing the data block having the access characteristic than the first medium,
the static characteristic component of the performance characteristic for the first medium or the second medium includes a factory cost per access and the dynamic characteristic component of the performance characteristic for the first medium or the second medium includes a determined cost per access.

14. The computer-readable memory of claim 13, wherein the first medium or the second medium is one of a battery backed memory, flash memory, or a hard disk.

15. The computer-readable memory of claim 13, wherein the acts further comprise storing the data block in the first medium.

16. The computer-readable memory of claim 13, wherein the access characteristic of the data block includes a frequency of access for the data block.

17. The computer-readable memory of claim 16, wherein the acts further comprise moving an additional data block stored on the second medium and having an additional frequency of access that is less than the frequency of access of the data block to the first medium in exchange for moving the data block to the second medium.

18. The computer-readable memory of claim 13, wherein the static performance characteristic component of the performance characteristic for the first medium or the second medium further includes a static access-per-second recommendation and the dynamic performance characteristic component of the performance characteristic for the first medium or the second medium further includes a dynamic access per second recommendation.

19. The computer-readable memory of claim 13, wherein the first medium is in local communication with a host and the second medium is in remote communication with the host.

* * * * *